United States Patent
Murphy et al.

[11] Patent Number: 6,147,598
[45] Date of Patent: *Nov. 14, 2000

[54] VEHICLE THEFT SYSTEM INCLUDING A HANDHELD COMPUTING DEVICE

[75] Inventors: Michael D. Murphy, San Jose; James M. Janky, Los Altos, both of Calif.

[73] Assignee: Trimble Navigation Limited, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/199,034

[22] Filed: Nov. 23, 1998

Related U.S. Application Data

[63] Continuation-in-part of application No. 08/887,664, Jul. 3, 1997.

[51] Int. Cl.[7] ................................................ B60R 25/10
[52] U.S. Cl. .................. 340/426; 340/425.5; 340/438; 340/825.31; 340/825.32; 340/904; 340/989; 307/10.2
[58] Field of Search .................. 340/426, 425.5, 340/438, 825.32, 825.31, 539, 904, 988, 989; 307/9.1, 10.1, 10.2

[56] References Cited

U.S. PATENT DOCUMENTS

| | | |
|---|---|---|
| 4,611,198 | 9/1986 | Levinson et al. ................. 340/539 |
| 5,027,104 | 6/1991 | Reid ............................... 340/541 |
| 5,144,661 | 9/1992 | Shamosh et al. ................. 380/9 |
| 5,430,431 | 7/1995 | Nelson ............................ 340/434 |
| 5,682,133 | 10/1997 | Johnson et al. ................. 340/426 |
| 5,689,442 | 11/1997 | Swanson et al. ................. 364/550 |
| 5,805,055 | 9/1998 | Colizza .......................... 340/426 |
| 5,917,405 | 6/1999 | Joao .............................. 340/426 |

*Primary Examiner*—Daniel J. Wu
*Assistant Examiner*—Toan Pham
*Attorney, Agent, or Firm*—Wagner, Murabito & Hao LLP

[57] ABSTRACT

A method and apparatus for providing a vehicle theft alarm using a handheld computing device. A handheld computing device is disclosed that includes an image capture device, a location determination system and a communication device. The handheld computing device can be used for capturing images and transmitting images to other locations via the communication device. The handheld computing device also includes a position determining system for determining position of the vehicle. The handheld computing device can be located within a vehicle and the alarm system activated such that, upon the occurrence of an alarm triggering event, the image capture device captures images of the driver's compartment of the vehicle and the location determination system determines the location of the vehicle. The captured images and the determined location are transmitted through the communication device to a designated remote location.

3 Claims, 9 Drawing Sheets

VEHICLE THEFT SYSTEM INCLUDING A HANDHELD COMPUTING DEVICE

RELATED APPLICATIONS

This application is a continuation-in-part of U.S. patent application Ser. No. 08/887,664 filed Jul. 3, 1997, now pending.

TECHNICAL FIELD

The present claimed invention relates to the field of vehicle theft prevention systems. More specifically, the present claimed invention relates to an improved alarm system.

BACKGROUND ART

A typical car alarm includes sensors disposed around the vehicle that detect designated events. These designated events typically include unauthorized entry, excessive movement of the vehicle, unauthorized attempts to start the vehicle, and unauthorized attempts to remove one or more components located within the vehicle. Unauthorized entry events typically include the opening of the hood, the opening of the trunk, and the opening of the vehicle's doors. One or more motion sensor is typically used to determine whether there is sufficient movement of the vehicle so as to indicate a possible theft. This provides a triggering of the alarm when there is an attempt to tow the vehicle or place the vehicle on a car carrier. Unauthorized attempts to start the car also indicate possible vehicle theft. In addition, attempts to remove a component such as, for example a stereo or a CD player also may indicate a possible theft.

Upon the occurrence of an alarm triggering event, car alarms typically make loud noises so as to scare the thief off or notify the owner of the possible theft. However, in many cases the owner of the vehicle is not close enough to the vehicle to hear the alarm. In these cases, only persons near enough to hear the alarm can prevent the theft. In most cities and in high traffic locations, the triggering of an audible car alarm is such a common event that people do not take notice of the event or take action of any kind. Thus, conventional car alarms often do not deter theft of the vehicle or theft of vehicle components or personal items left in the vehicle.

In many cases, even if the owner does hear the car alarm, he may be so far from the vehicle that the vehicle is stolen or property is stolen from the vehicle before he can get back to the vehicle. In other cases, the car alarm is disabled so quickly that the owner is not made aware of the theft. This is particularly likely when a professional thief is trying to steal the car since many professional thieves can turn off the audible alarm and hot wire the car within seconds of their entry into the vehicle. Typically, a professional thief can also disable automatic shutoff systems within minutes of entering the vehicle.

These vehicle alarm systems often fail to prevent theft. In addition, these systems do not aid in any way attempts to recover the vehicle or the stolen property. In addition, these vehicle alarm systems do not assist law enforcement agencies in identifying or prosecuting thieves. Also, vehicles are typically stripped and abandoned, leaving little, if any evidence of the identification of the thief.

What is needed is a vehicle alarm system that will send a positive alarm so as to notify the owner of the break in or theft. Also, a vehicle alarm system that will assist in the location of the vehicle and/or the location of the property taken from the vehicle is needed. In addition, a vehicle alarm system that will assist law enforcement agencies in identifying the thief is also needed.

DISCLOSURE OF THE INVENTION

The present invention meets the above need with a vehicle alarm system that captures images of the passenger compartment of the vehicle and determines the location of the vehicle. The images and the determined location are then transmitted to a remote location.

In one embodiment of the present invention a handheld computing device that includes an image capture device is installed in the passenger compartment of the vehicle. Upon the occurrence of an alarm triggering event, the image capture device captures images of the passenger compartment of the vehicle.

The handheld computing device also includes a location determination system adapted to determine location of the vehicle. In one embodiment, the location determination system uses satellites of the Global Positioning System (GPS) to determine position. Upon the occurrence of an alarm triggering event, when the handheld computing device is in the vehicle, the location determination system determines the location of the vehicle.

The handheld computing device includes a wireless communication device. The wireless communication device is adapted to communicate with one or more remote locations. Upon the occurrence of an alarm triggering event, the wireless communication device transmits the captured image and the determined location to a remote location. The transmission may be direct or may be coupled through one or more transmission networks such as a cellular network, a packet radio network, and/or conventional land lines.

In one embodiment, the handheld computing device is adapted to couple to a remote location via transmission over the internet. The handheld computing device includes a data storage device that stores communication transfer protocol data. The communication system makes contact with an internet service provider using the stored transfer protocol data. The data that is to be transmitted is converted into an appropriate internet transfer format. The wireless communication device then transfers the images and the determined location over the internet to a designated location or locations. In one embodiment, the data is transferred to the user's home computer as electronic mail (e-mail). Alternatively, the data is transferred to an alarm monitoring company or directly to a local law enforcement agency.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 1:
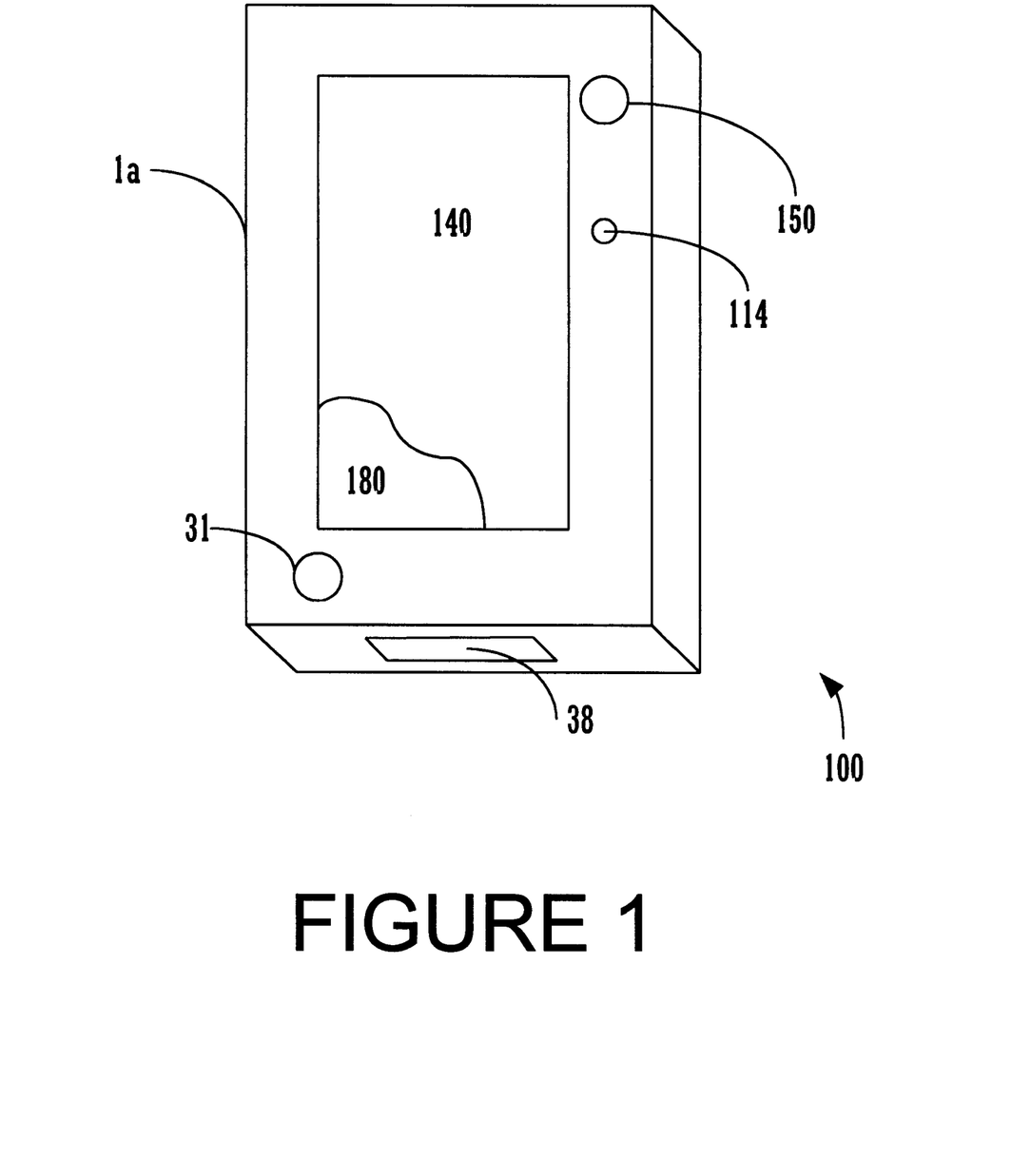
FIG. 1 is a diagram illustrating a vehicle alarm system incorporated into a handheld computing device in accordance with the present invention.

FIG. 1 shows vehicle alarm system 100 that is integrated into a handheld computing device 1a in accordance with one embodiment of the present invention. Alarm system 100 includes motion detector 114 that indicate a possible theft. Though motion detector 114 is shown to be a single motion detector, alternatively, multiple detectors and/or different types of detectors can be used.

Handheld computing device 1a of FIG. 1 also includes display device 180 that is operable to display images. In one embodiment, display device 180 is a liquid crystal display. However display device 180 may be a thin cathode ray tube, or other display device suitable for creating graphic images and/or alphanumeric characters recognizable to the user.

Input device 140 allows for user input and command selection. Operation of input device 140 also activates and deactivates the alarm system. In one embodiment, input device 140 is a touch screen operable in conjunction with menus displayed on display 180 for data input and command selection using methods well known in the art. Alternatively, input device 140 may be a standard alphanumeric keypad and/or dedicated function keys. Input device 140 can also be a cursor control device that allows the computer user to dynamically signal the two-dimensional movement of a visible symbol (cursor) on a display screen of display device 180. Many implementations of a cursor control device are known in the art including a trackball, mouse, touch pad, joystick or special keys capable of signaling movement of a given direction or manner of displacement. The present invention is also well suited to input by other means such as, for example, voice commands.

Continuing with FIG. 1, on/off button 31 allows for turning handheld computing device 1a on and off. Coupling device 38 allows for connection to other devices. In one embodiment, coupling device 38 is a connector receptacle adapted to mate with a corresponding connector.

Continuing with FIG. 1, image capture device 150 allows for the capture of images. In one embodiment, image capture device 150 is a digital camera. Image capture device 150 may be a Charge Coupled Device (CCD) adapted to capture digital images. Alternatively, image capture device 150 may use any of a number of known methods for capturing images such as, for example, video image recording methods, etc. In one embodiment image capture device 150 is a Video Cassette Recording (VCR) device that includes a target adapted to capture digital images.

Figure 2:
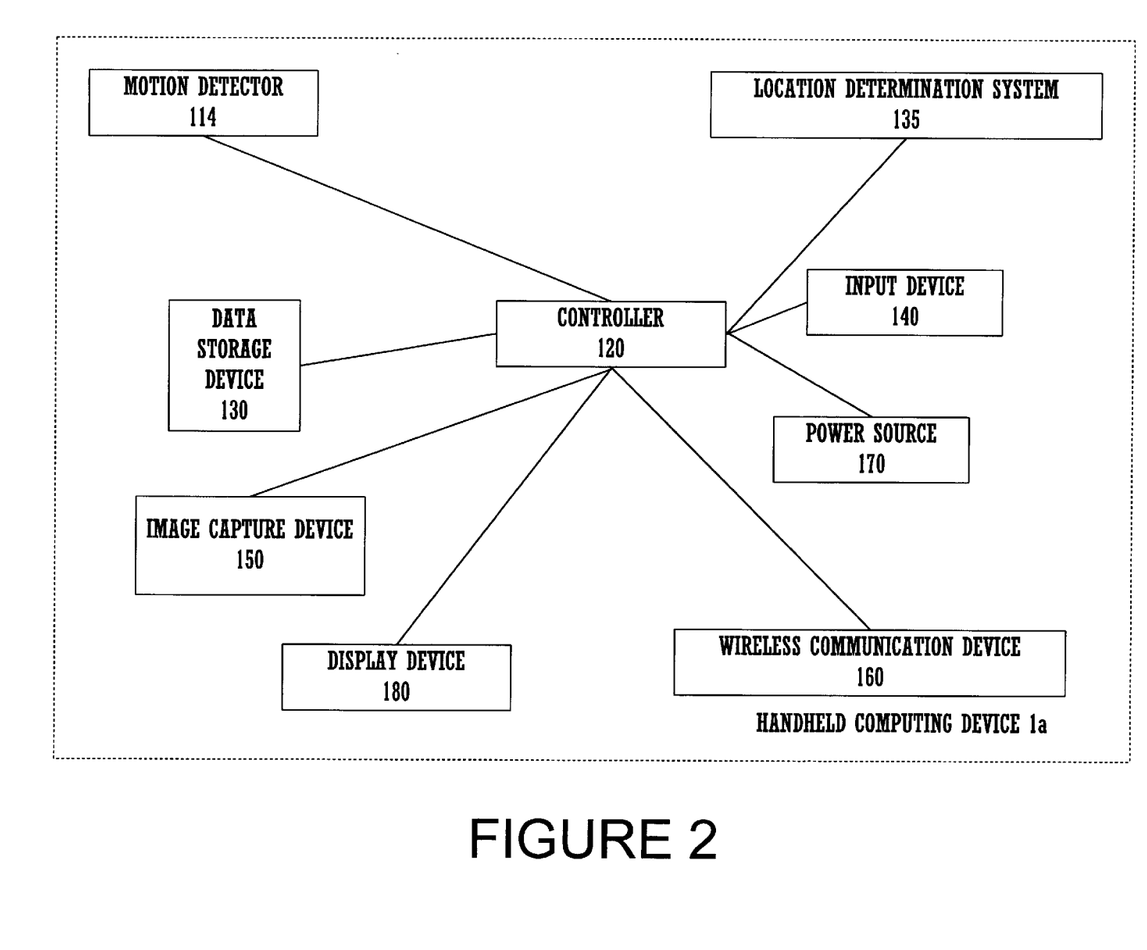
FIG. 2 is a schematic diagram illustrating a vehicle alarm system incorporated into a handheld computing device that includes a motion detector in accordance with the present invention.

Referring now to FIG. 2, in one embodiment, handheld computing device 1a includes a wireless communication device 160. In one embodiment, wireless communication device 160 includes a radio transmitter adapted to transmit data to a remote location. In one embodiment, wireless communication device 160 transmits and receives data over an unlicensed radio frequency. However, licensed frequency bands could also be used. Data may be transmitted using any of a number of different transmission methods and formats and may be single-channel or multi-channel. In one embodiment time division multiple access (TDMA) transmission is used for conveying data. Other embodiments can employ Code Division Multiple Access (CDMA) or analog channels as defined by the AMPS standard(as is used throughout the U.S.) in which a data modem converts data to tones.

In one embodiment, wireless communication device 160 of FIG. 2 is a packet radio that couples data via a network of packet radios (e.g. the Ricochet Network, operated by Metricom, Inc. of Los Gatos, Calif.). Packet radios are readily available and may be purchased by, for example, Metricom, Inc. of Los Gatos, Calif.

Continuing with FIG. 2, in another embodiment, wireless communication device 160 is a wireless data modem adapted to communicate via a cellular communication network. Wireless data modems are readily available and may be purchased from, for example, Motorola, Inc. of Schaumburg, Ill.

Still referring to FIG. 2, in another embodiment, wireless communication device 160, is adapted to relay data using an infrared transmitter/receiver system such as is currently found in computer to printer data transfer systems. Such systems are readily available and may be purchased from Hewlett Packard of Palo Alto, Calif.

Handheld computing device 1a of FIG. 2 includes controller 120 for controlling the operations of handheld computing device 1a. In one embodiment, controller 120 is a general-purpose microprocessor that has low power consumption such as, for example, a MIPS R4K microprocessor made by Silicon Graphics Inc., of Mountain View, Calif. In one embodiment, a computer program operates on controller 120 for controlling the operations of handheld computing device 1a. The operating program can be a multi-purpose operating program such as, for example, a Windows CE program that is made by Microsoft Corporation of Redmond, Wash. The use of a multi-purpose operating program allows for a variety of programs and operations to be performed by handheld computing device 1a in addition to alarm operation and control functions. Alternatively, controller 120 can be an Application Specific Integrated Circuit (ASIC) device or a Field Programmable Gate Array (FPGA) device that is programmed to perform the desired functions.

Continuing with FIG. 2, power source 170 provides power to the various components of handheld computing device 1a. Power source 170 may be any suitable power source that is light weight and compact such as, for example, AA or AAA batteries.

Data storage device 130 is coupled to controller 120 and is adapted to store data. Data that can be stored in data storage device 130 includes, for example, user identification codes and/or passwords for alarm engagement and disengagement. Data storage device 130 may also be used to store digital images captured by image capture device 150. Data storage device 130 may be any type of digital data storage medium. In one embodiment, data storage device 130 is a Random Access Memory (RAM) device such as, for example, a Static Random Access Memory (SRAM) device, a Dynamic Random Access Memory (DRAM) device or a flash memory storage device.

Continuing with FIG. 2, handheld computing device 1 also includes location determination system 135. In one embodiment, location determination system 135 includes signal reception and processing circuitry adapted to determine position using satellites of the US Global Positioning System (GPS). Location determination systems for determining position using the GPS are well known in the art (e.g., systems manufactured by Trimble Navigation of Sunnyvale, Calif.). A useful discussion of the GPS and techniques for determining position is found in Tom Logsdon, The Navstar Global Positioning System, Van Nostrand Reinhold, 1992, pp. 17–90, which is incorporated by reference herein.

Although satellites of the US Global Positioning System are preferably used to obtain Location, any of a number of other systems can be used, either exclusively, or in conjunction with the GPS for determining position such as, for example, the Global Orbiting Satellite System (GLONASS), LORAN, pseudolites, Wide Area Augmentation System (WAAS) satellites or other, similar location determination enabling systems.

Figure 3A:
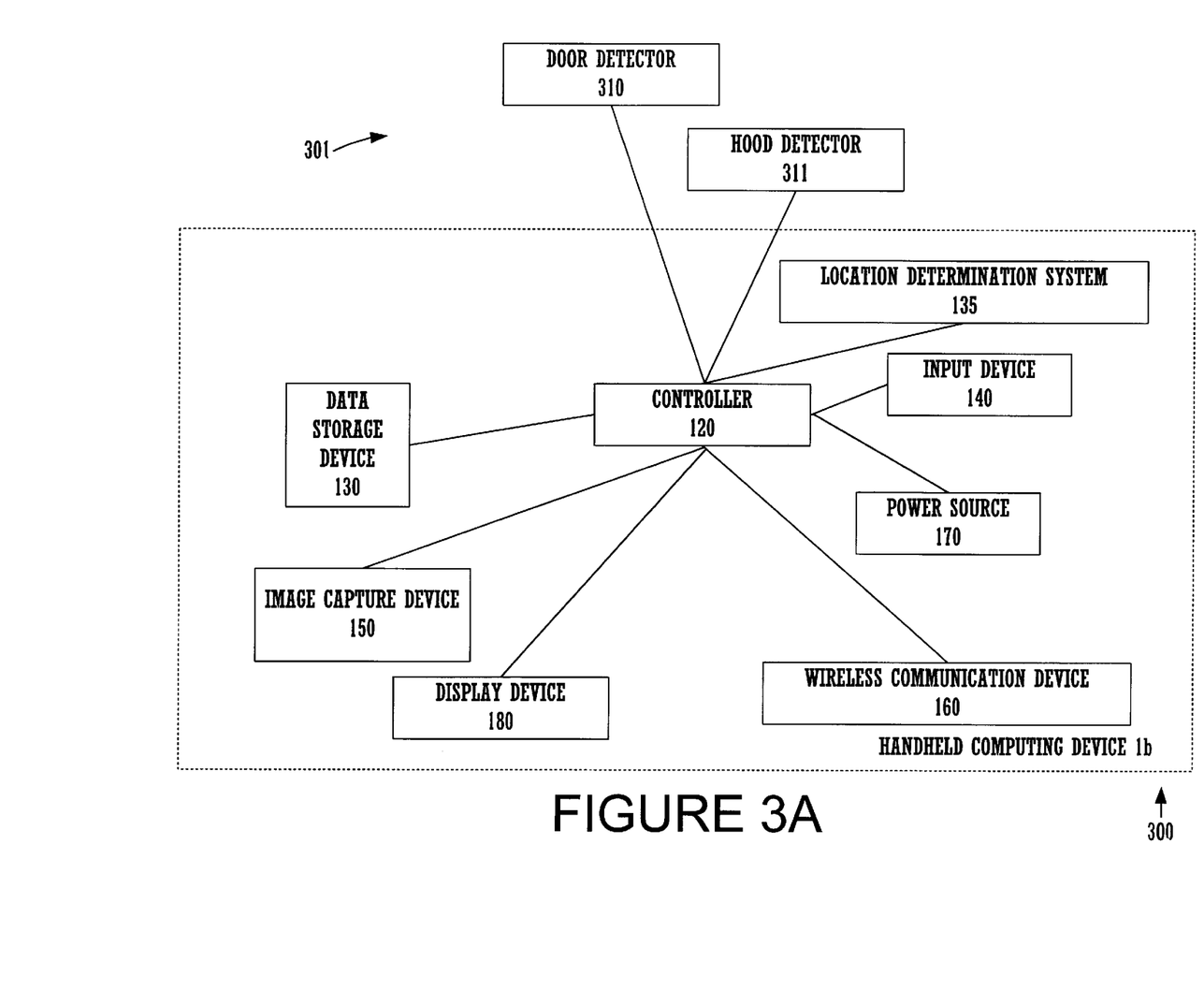
FIG. 3A is a schematic diagram illustrating a vehicle alarm system incorporated into a handheld computing device that is coupled to remote detectors in accordance with the present invention.

Alarm system 300 of FIG. 3A shows an embodiment of the present invention that includes handheld computing device 1b that is coupled to remote detectors 301. In one embodiment, remote detectors 301 include door detector 310 and hood detector 311. Remote detectors 301 may be physical detection mechanisms such as switches located so as to indicate alarm triggering events. Alternatively, remote detectors 301 are electrical circuits coupled to the electrical circuitry of a vehicle that is adapted to detect an alarm triggering event.

Figure 3B:
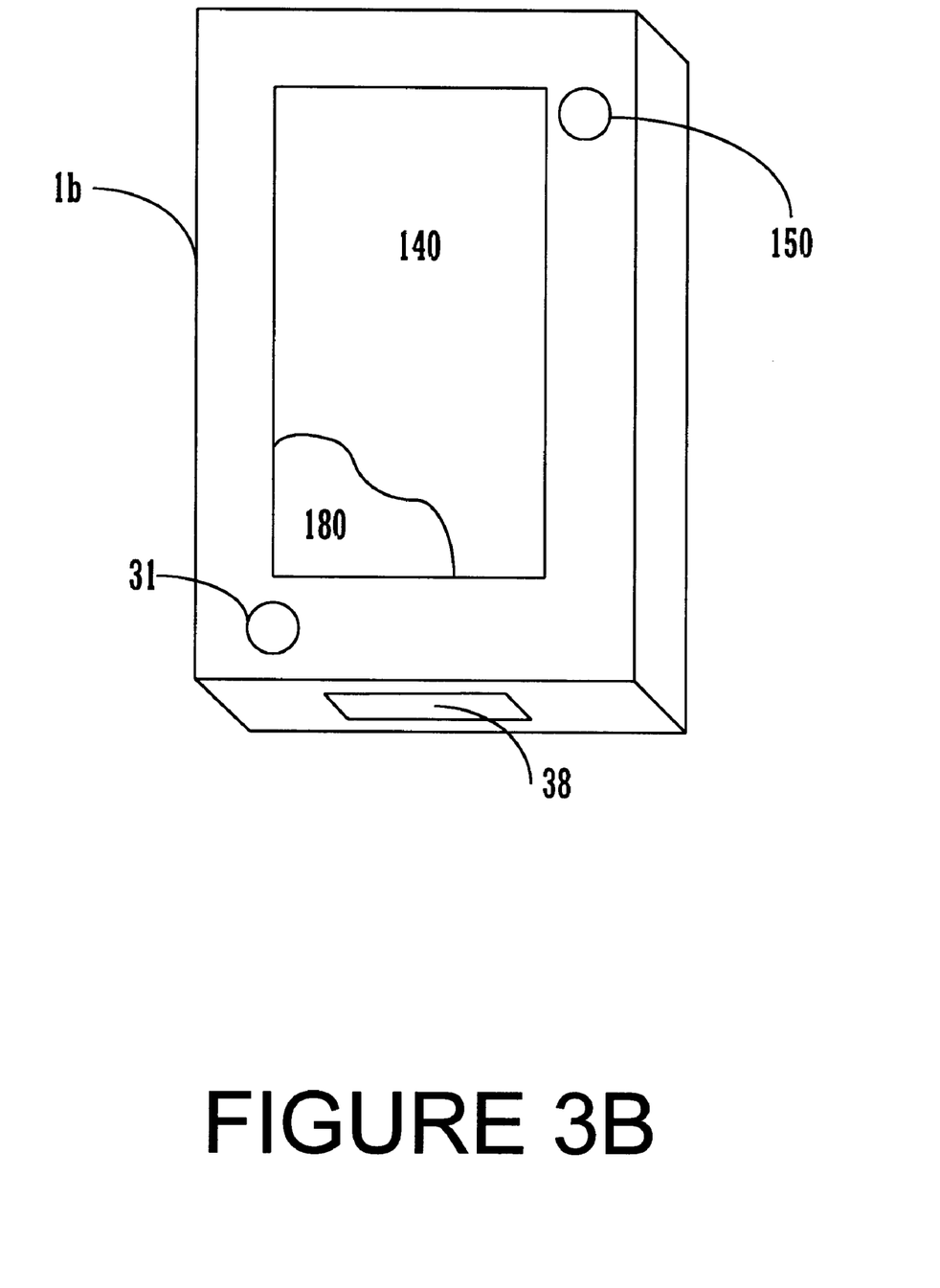
FIG. 3B is a diagram illustrating a vehicle alarm system incorporated into a handheld computing device that includes a motion detector in accordance with the present invention.

Referring now to FIG. 3B, handheld computing device 1b is identical to handheld computing device 1a of FIGS. 1–2 except that handheld computing device 1b does not include a motion detector. Handheld computing device 1b is adapted to couple to remote detectors such as remote detectors 301 shown in FIG. 3A. In the embodiment shown in FIGS. 3A–3B, coupling with remote detectors is accomplished by inserting handheld computing device 1b into docking stand 636 (FIG. 6) such that coupling device 632 couples with coupling device 38 of handheld computing device 1b.

Figure 4:
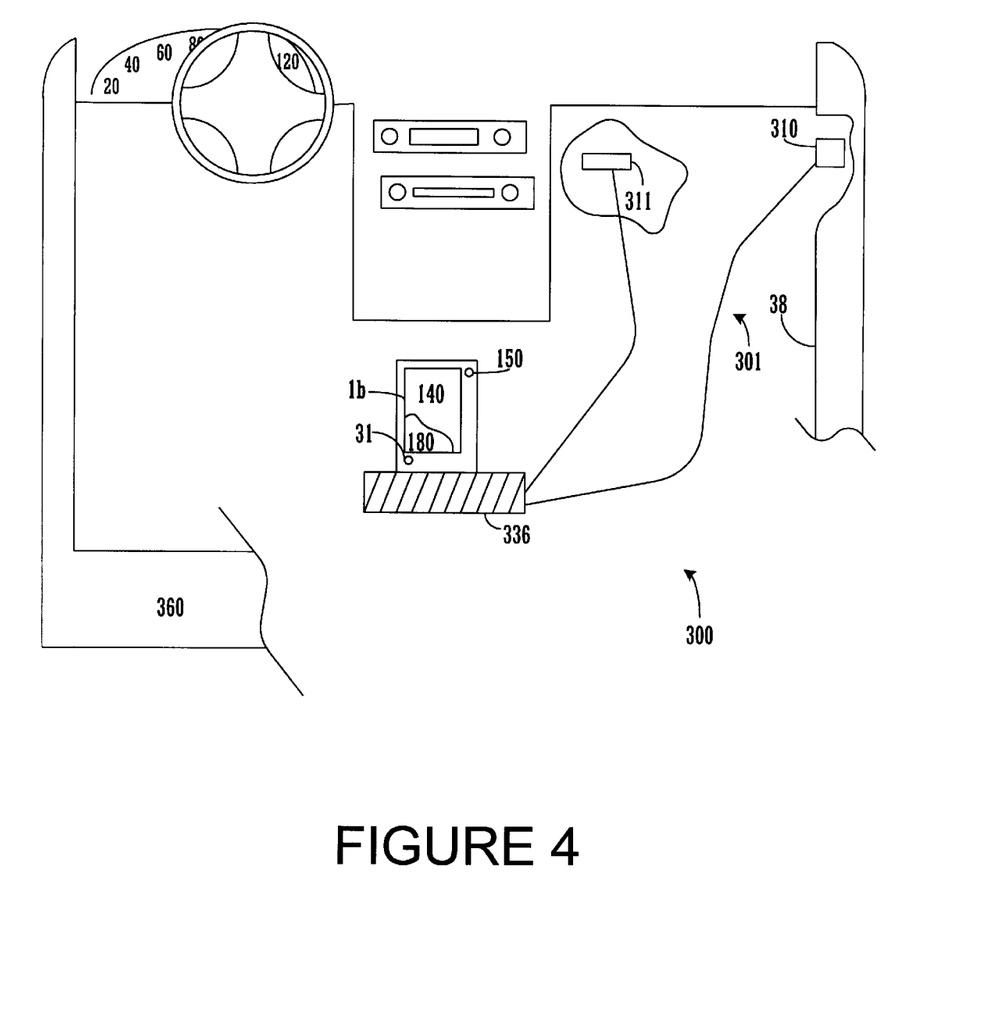
FIG. 4 is a diagram illustrating a vehicle alarm system incorporated into a handheld computing device that is coupled to remote detectors and that is disposed in the passenger compartment of a vehicle in accordance with the present invention.

FIG. 4 shows an embodiment of alarm system 300 that is disposed in vehicle 360. A docking port 336 that is adapted to receive handheld computing device 1b couples handheld computing device 1b to external detectors 301. In one embodiment, docking port 336 includes a coupling device (e.g. a connector) that is adapted to couple to coupling device 38 shown in FIG. 3B. In one embodiment, docking port 336 couples to the electrical system of vehicle 360 for providing power to handheld computing device 1 and for charging power source 170 (FIG. 3A) when power source 170 is adapted to be charged.

Continuing with FIG. 4, in one embodiment, door detector 310 is a switch that is coupled to the door of vehicle 360 and hood detector 311 is a switch that is coupled to the hood of vehicle 360 for determining when the hood is opened. Detectors 301 of FIGS. 3–4 may also include additional or different: types of detectors such as, or example, a motion detector, an ignition detector, a power disconnect detector, etc. Such detectors are well known in the art for use in vehicle alarm systems.

In one embodiment, electrical cable is used to connect detectors 310–311 to docking port 336. Alternatively, an infrared link may be use to couple detectors 310–311 to docking port 336 and/or to handheld computing device 1b. In one embodiment, detectors 310–311 are coupled to docking port 336 via standard electrical cable and an infrared link within docking port 336 is used to electrically couple data to handheld computing device 1b. When an infrared link is used to couple data to handheld computing device 1b, the infrared link may also be used automatically synchronize data.

Figure 5:
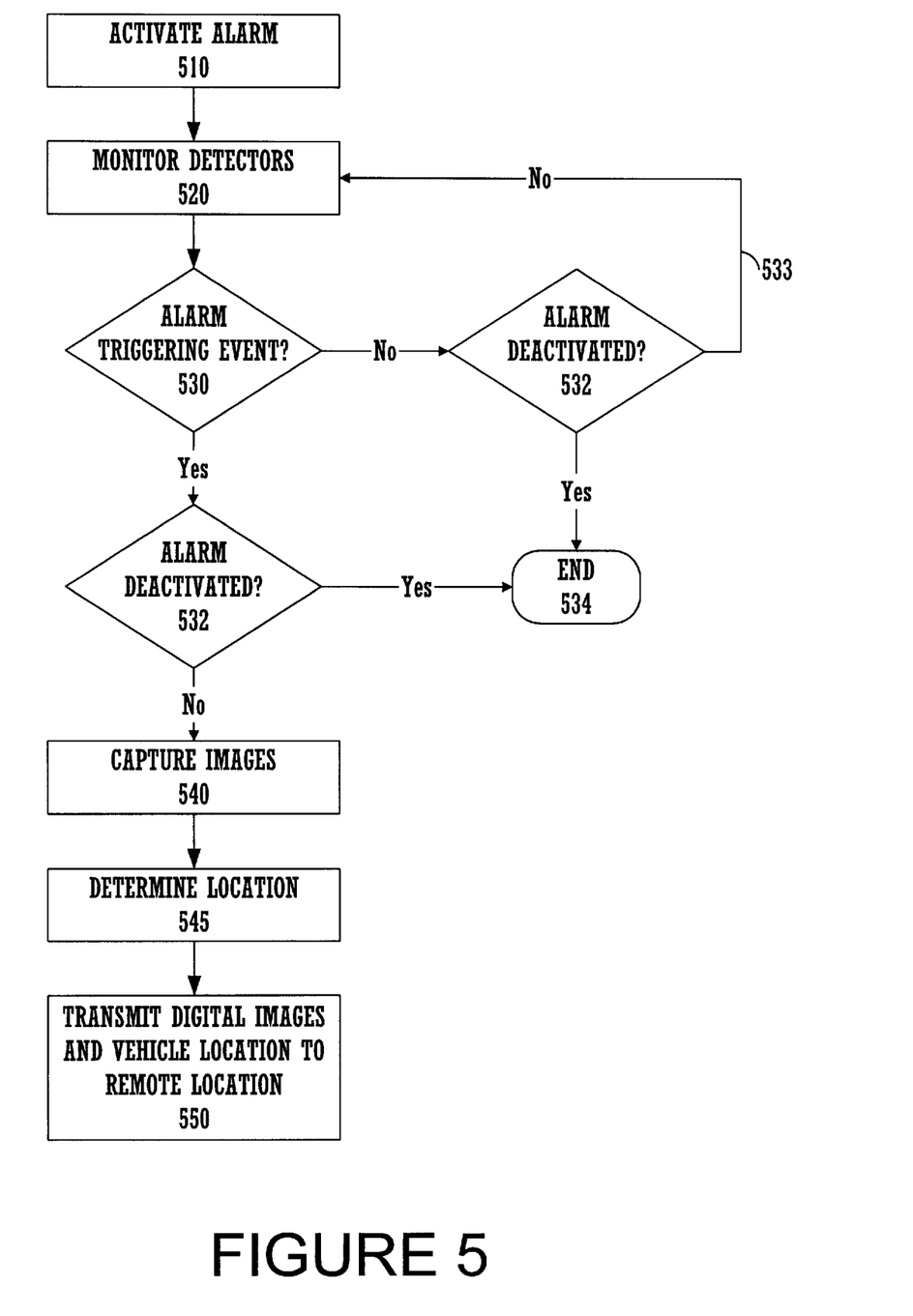
FIG. 5 is a flow chart showing a method for indicating an alarm in accordance with the present invention.

FIG. 5 illustrates the operation of the alarm system of the present invention. First, as shown by block 510, the alarm is activated. In the embodiment shown in FIGS. 1–4, the alarm system is activated by touching input device 140 (when input device 140 is a touch-screen) so as to indicate that the alarm system is to be activated. Alternatively, activation may be automatic upon the locking of the vehicle's door from the outside of the vehicle or by the use of a remote device that couples to the alarm system by radio or infrared link.

Referring now to FIG. 5, upon activation of the vehicle alarm system of the present invention, each of the alarm system's detectors are monitored as shown by block 520 for an alarm triggering event, shown by block 530. That is, in the embodiment shown in FIGS. 1–2, detector 114 is monitored and in the embodiment shown in FIGS. 3A, 3B, and 4, detector 114 and detectors 301 are monitored.

Continuing with FIG. 5, monitoring continues until the alarm is deactivated, or until an alarm triggering event occurs as shown by blocks 520, 530, 532, 534 and line 533. Deactivation of the alarm may be by any of a number of known methods. Deactivation is accomplished by operating input device 140 of FIGS. 1–4 so as to enter a code. Alternatively, the alarm is deactivated by the use of the proper key in the door's lock or by operating a remote device that couples to the alarm system by radio or infrared link. Also, a dedicated hidden "off" button or switch may be used. When deactivation is accomplished by entering a code, that code is compared with authorization codes contained in data storage. For example, in the embodiment shown in FIGS. 1–4, authorization codes are stored in data storage device 130 and are compared with the code entered by the user. In the event that the authorization code matches a code stored in data storage, the alarm is deactivated as shown by steps 532–534. Deactivation may be before or after an alarm triggering event. That is, the user may deactivate the alarm before the occurrence of an alarm triggering event and may deactivate the alarm system within a predetermined amount of time after an alarm triggering event. In one embodiment, a predetermined time of 20 seconds is used to allow the user sufficient time to enter into the vehicle and deactivate the alarm.

Alarm triggering events may be any of a number of known events that indicate a potential theft of the vehicle or a theft of the contents of a vehicle. In one embodiment, the entry of an incorrect code is an alarm triggering event. In the embodiment shown in FIGS. 1–2, detection of motion by detector 114 is an alarm triggering event. Similarly, in the embodiment shown in FIGS. 3A–4, the opening of door 38, detected by door detector 310, is an alarm triggering event. Similarly, the opening of the hood, detected by hood detector 311, is an alarm triggering event.

Upon the occurrence of an alarm triggering event, when the alarm is not deactivated within the allowed time period, images are captured as shown by block 540 of FIG. 5. The capture of images may use any of a number of known image capture methods. In the embodiments shown in FIGS. 1–4, image capture device 150 is used to capture an image. When image capture device 150 is a digital camera, digital photographic methods are used to capture one or more images. Upon the capture of an image, the image is temporarily stored in a data storage device such as data storage device 130 (FIGS. 2–3A).

Then, as shown by step 545 of FIG. 5 location is determined. Any of a number of known methods for determining location can be used. In the embodiment shown in FIGS. 1–4, location determination system 135 is used to determine the location of the vehicle. Satellites of the US Global Positioning System are preferably used to obtain location. However, any of a number of other systems such as Global Orbiting Satellite System (GLONASS), LORAN, pseudolites, Wide Area Augmentation System (WAAS) satellites or other, similar location determination enabling systems could also be used either exclusively, or in combination with the GPS for determining position.

Still referring to FIG. 5, digital images are then transmitted, along with the vehicle's location, to a remote location as shown by block 550. In one embodiment, communication is to a remote location that is a computer located in the user's home. Alternatively, communication is directly to a local police department or to an alarm monitoring company. In the embodiment shown in FIGS. 1–4, when wireless communication device 160 includes a radio, communication takes the form of one or more radio transmissions that couple data to the desired remote location. The radio transmissions may be transmitted directly, or may be coupled through one or more transmission networks such as, for example, a cellular network, a radio transmission network (e.g. the Ricochet Network), a satellite network or conventional land lines.

Continuing with FIG. 5, any of a number of known transmission formats may be used for transmission (e.g. ALOHA, TDMA, etc.). The location data corresponding to the vehicle's location may be transmitted in the background, as blank and burst sequential data segments, overlaid over the digital images, or transmitted over a separate communication channel.

In one embodiment, communication is through a communication network that couples to an internet service provider. That is, communication is initiated between the alarm system and an internet service provider. Transmission protocol data stored in data storage device 130 of FIGS. 2–3A is transmitted to the internet service provider so as to "log-on." Captured images and the vehicle's location are then transmitted to the internet service provider. When digital video images are to be transmitted, a video software package such as Webcam 32, manufactured by Neil Kolban of Richardson, Tex., can be used to record and transmit the images. The internet service provider then transmits the digital images and the determined vehicle location over the internet to the desired remote location. The transmitted information can be sent directly to a specified location, such as, for example, the user's home computer, a web server, an alarm service company's site, or directly to a police station or a sheriff's office. Alternatively, the digital images and the determined vehicle location may be sent as e-mail, with storage on a web server for later retrieval.

Communication with an internet service provider may be direct, or may be coupled through one or more data transmission systems. For example, a cellular network may be used to access an internet service provider (either directly or via a combination of cellular transmission and terrestrial phone lines). Also, a wireless packet radio transmission system or a satellite radio transmission system can be used (Solely, or in combination with another transmission system or network) to couple the transmitted data to a remote location.

Figure 6:
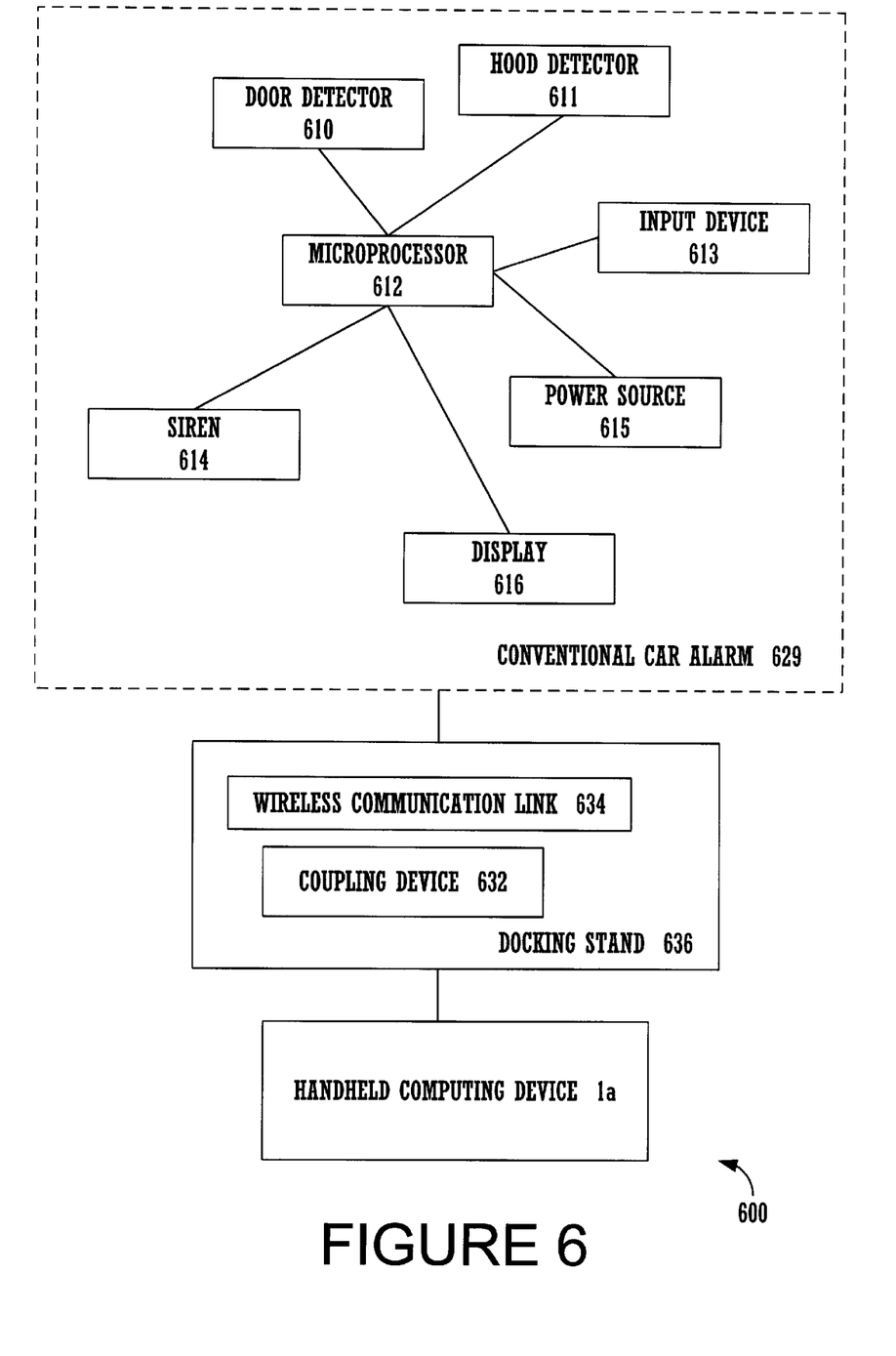
FIG. 6 is a schematic diagram illustrating a vehicle alarm system that includes a handheld computing device that is coupled to a conventional alarm system in accordance with the present invention.
Figure 7:
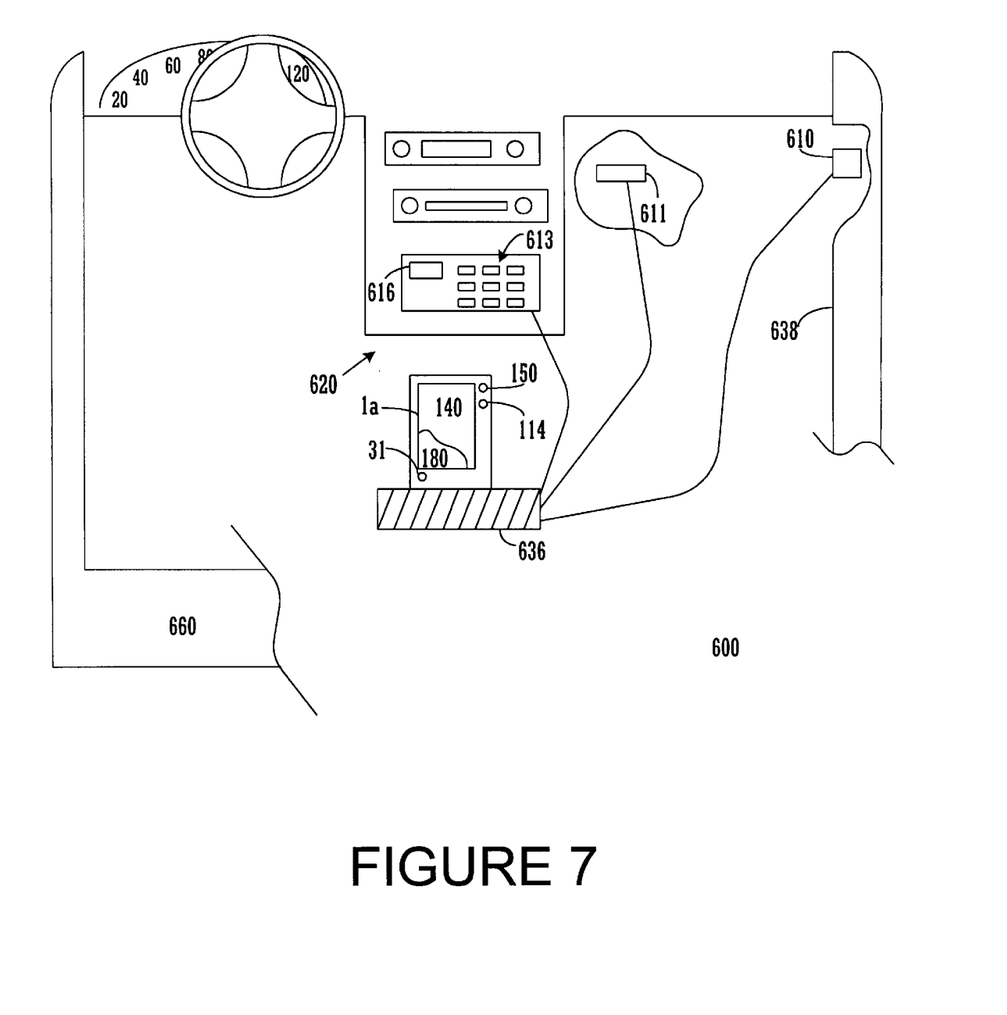
FIG. 7 is a diagram illustrating a vehicle alarm system incorporated into a handheld computing device that is coupled to a conventional alarm system and that is disposed in the passenger compartment of a vehicle in accordance with the present invention.
Figure 8:
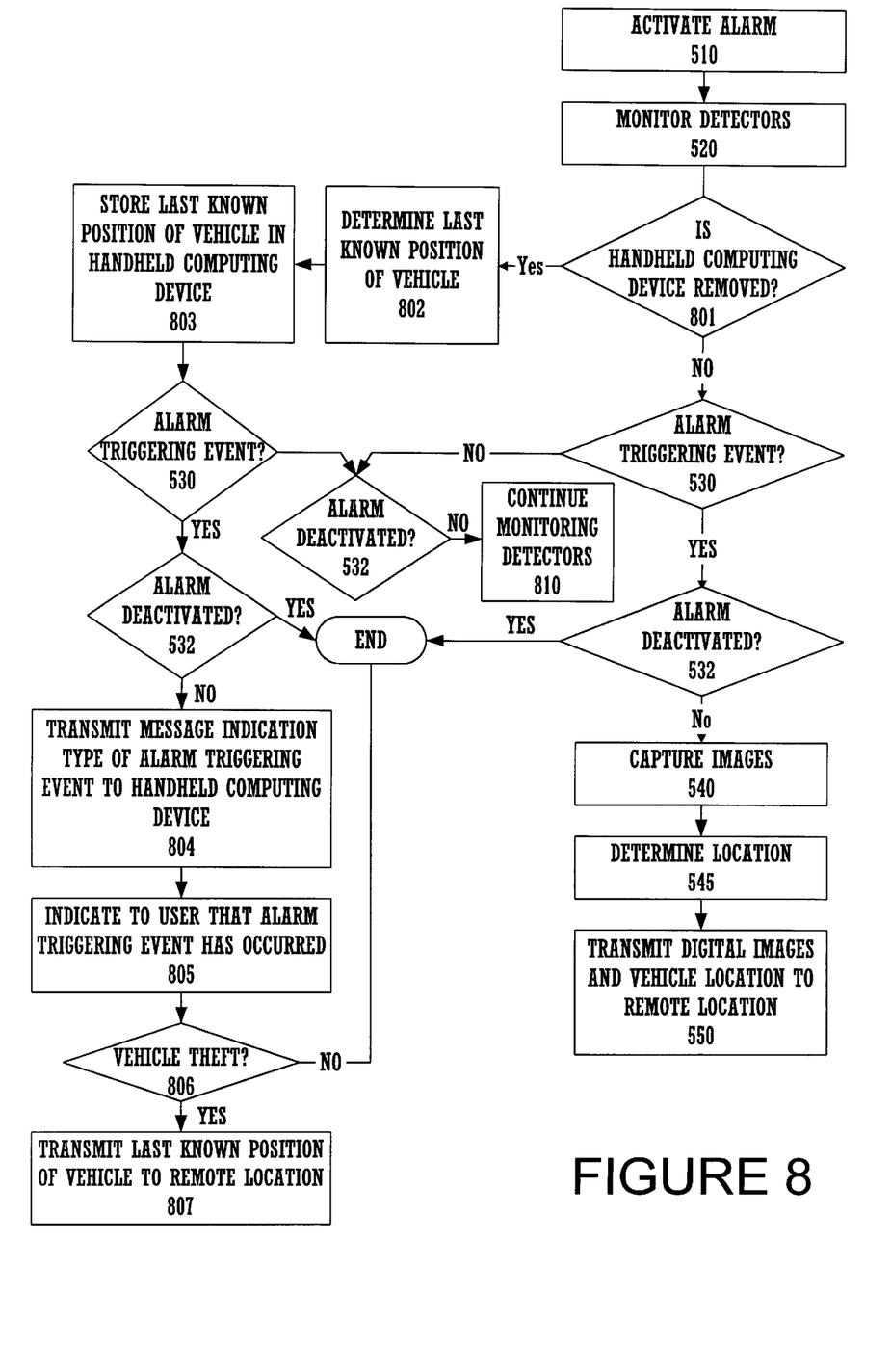
FIG. 8 is a flow chart showing a method for indicating an alarm using a handheld computing device that is coupled to a conventional alarm system in accordance with the present invention.

The present invention is well adapted for use with a conventional car alarm system. FIGS. 6–8 illustrate a vehicle alarm system 600 that includes a conventional car alarm. In the embodiment shown in FIGS. 6–7, a conventional car alarm 629 is shown that includes display 616 and input device 613. Power source 615 supplies power to the conventional alarm when power from the vehicle's power supply is interrupted. Detectors, including door detector 610 and hood detector 611 monitor the vehicle for alarm triggering events. The operation of conventional car alarm 629 is controlled by microprocessor 612. In the event of an alarm triggering event, microprocessor 612 sounds an alarm by activating siren 614 and/or by engaging other audible or visible devices (e.g. flashing the vehicle's lights or activating the vehicle's horn).

Continuing with FIGS. 6–7, conventional car alarm 629 may include any of a number of additional features such as, for example, motion detectors, ignition detectors, power supply interrupt detectors, remote activation/deactivation devices, etc. Also, conventional car alarm 629 may include circuitry that disables the ignition system, etc.

Referring now to FIG. 7, alarm system 600 is shown to be installed in vehicle 660. In this embodiment, conventional car alarm 629 includes an input device 613 that is an alphanumeric keypad and a display 616 that is a small liquid crystal display.

Continuing with FIGS. 6–7, docking stand 636 is used to couple handheld computing device 1a to conventional car alarm 629 (Alternatively, handheld computing device 1b of FIGS. 3A–4 could be used). Cocking stand 636 is shown to include coupling device 632 (e.g. a connector or a connector receptacle) that is adapted to mate with coupling device 38 of FIG. 2. Docking stand 636 also includes wireless communication link 634 that is adapted to communicate with handheld computing device 1a when handheld computing device 1a is removed from docking stand 636. In one embodiment, wireless communication link 634 communicates with handheld computing device 1a using infrared transmission methods (e.g., when wireless communication link 634 includes an infrared transmitter and communication device 160 of handheld computing device 1b (FIG. 2) includes an infrared receiver). Alternatively, communication link 634 communicates with handheld computing device 1a via radio transmission. When radio transmission is used, wireless communication link 634 is a radio transmitter adapted to transmit data to wireless communication device 160 of handheld computing device 1a. In one embodiment, communication between docking stand 636 and handheld computing device 1a uses a packet radio transmission network (e.g., the Ricochet Network) or a cellular network to communicate when handheld computing device 1a is out of direct radio transmission range of wireless communication link 634.

Referring now to FIG. 8, a method for providing a vehicle alarm is shown. First, as shown by step 510, the alarm system is activated. Activation is performed by touching the touch screen of handheld computing device 1a or 1b of FIGS. 1–7 so as to enter a code. In one embodiment, the activation is communicated to the conventional car alarm such that the conventional car alarm is also activated. That is, in the embodiment shown in FIG. 6, the operation of input device 140 so as to activate alarm system 600 also activates conventional car alarm 629. Alternatively, a user may use the input device (e.g. keypad) of the conventional car alarm to activate the alarm system. In the embodiment shown in FIG. 7, operation of keypad 613 by entering in a correct code activates alarm system 600.

Continuing with FIG. 8, upon activation, detectors are monitored as shown by step 520. In the embodiment shown in FIGS. 7–8, the detectors that are monitored include detector 114 of handheld computing device 1a and detectors in conventional car alarm 629 (i.e. door detector 610 and hood detector 611).

Continuing with FIG. 8, monitoring continues until the alarm is deactivated, or until an alarm triggering event occurs as shown by blocks 520, 530, 532, 534 and 810. Deactivation of the alarm may be by any of a number of known methods. In one embodiment, the alarm is deactivated by the use of the proper key in the door's lock. Alternatively, deactivation may be by a remote device that couples to the conventional car alarm by radio or infrared link. Deactivation may also be accomplished by operating input device 140 of FIGS. 1–2 or by operation of input device 613 of FIGS. 6–7 so as to enter a code. Alternatively a dedicated hidden "off" button or switch may be used. Deactivation may be before or after an alarm triggering event. That is, the user may deactivate the alarm before the occurrence of an alarm triggering event and may deactivate the alarm system within a predetermined amount of time after an alarm triggering event. In one embodiment, a predetermined time of 20 seconds is used to allow the user sufficient time to enter into the vehicle and deactivate the alarm.

Alarm triggering events may be any of a number of known events that indicate a potential theft of the vehicle or a theft of the contents of a vehicle. In one embodiment, the entry of an incorrect code into either the handheld computing device or the conventional car alarm is an alarm triggering event. In the embodiment shown in FIGS. 6–7, detection of motion by detector 114 is an alarm triggering event. Similarly, in the embodiment shown in FIGS. 6–7, the opening of door 638, detected by door detector 610, is an alarm triggering event. Similarly, the opening of the hood, detected by hood detector 611, is an alarm triggering event.

Upon the occurrence of an alarm triggering event, when the alarm is not deactivated within the allowed time period, images are captured as shown by block 540 of FIG. 8. Then, as shown by step 545 of FIG. 8 location is determined.

Still referring to FIG. 8, digital images are then transmitted, along with the vehicle's location, to a remote location as shown by block 550. In one embodiment, communication is to a remote location that is a computer located in the user's home. Alternatively, communication is directly to a local police department or to an alarm monitoring company. In one embodiment, radio transmission methods are used, with either direct transmission or transmission coupled through one or more transmission systems such as, for example, a cellular network, a radio transmission network (e.g. the Ricochet Network), a satellite network or conventional land lines, etc.

In one embodiment, the digital images and the determined vehicle location are transmitted over the internet to the desired remote location. The transmitted information can be sent directly to a specified location, such as, for example, the user's home computer, a web server, an alarm service company's site, or directly to a police station or a sheriff's office). Alternatively, the digital images and the determined vehicle location may be sent as e-mail.

Coupling to the internet may be direct, or may include transmission through one or more data transmission networks (e.g., a cellular network, a wireless packet radio network, a satellite radio transmission system, terrestrial phone lines, etc.).

Continuing with FIG. 8, when the handheld computing device is removed from the docking station (step 801), the last known position of the vehicle is determined as shown by step 802. In one embodiment, the first location computed by the location determination system after the removal of the handheld computing device from the docking station is used as the last known position. The determination of location uses the same methods discussed in step 545 of FIGS. 5 and 8. The last known position is then stored in the handheld computing device as shown by step 803. In the embodiment shown in FIGS. 2–3A, the last known position is stored in data storage device 130.

Continuing with FIG. 8, when the handheld computing device is removed from the docking station and an alarm triggering event occurs (step 530), unless the alarm is deactivated within a predetermined amount of time (step 532), an unauthorized entry has occurred. The docking station then communicates with the handheld computing device as shown by step 804 and transmits a message indicating the type of alarm triggering event (e.g., transmission of message indicating that door has been opened). In the embodiment shown in FIGS. 6–7, communication link 390 is used to communicate with handheld computing device 1a. In an embodiment in which wireless communication link 634 is an infrared transmitter, data is transmitted to handheld computing device 1a using infrared methods. That is, when infrared transmission methods are used, wireless communication device 160 includes an infrared receiver.

Still referring to FIG. 8, in one embodiment, the handheld computing device then indicates the occurrence of an alarm triggering event as shown by step 805. In one embodiment, the phrase "vehicle theft!" is displayed on the display of the handheld computing device to indicate the occurrence of an alarm triggering event. An audible tone may also be emitted by the handheld computing device to indicate the occurrence of an alarm triggering event. In one embodiment, the type of alarm triggering event is indicated (e.g. "door has been opened").

Still referring to FIG. 8, the user is then prompted as to whether the alarm triggering event is a vehicle theft as shown by block 806. The user then operates the handheld computing device so as to select whether or not the alarm triggering event is a vehicle theft. That is, if the user determines that the alarm triggering event is not a theft, the user can operate the handheld computing device (e.g. by touching the portion of the display indicating "no theft") so as to end the monitoring process. Alternatively, the user may operate the handheld computing device so as to indicate that a theft has occurred (e.g. by touching the portion of the display indicating "theft in progress"). If the user indicates that a theft has occurred, as shown by steps 806 and 807, the handheld computing device transmits a message to a remote location that includes the last known position of the vehicle as determined in step 803. This message may also include data indicating that the vehicle has been stolen and the identification of the vehicle and the owner of the vehicle. In the embodiment shown in FIG. 2, wireless communication device 160 is operable to transmit the message to a designated remote location. The remote location may be the user's home, an alarm company, and/or the police or other responsible authority.

Referring back to the embodiment shown in FIG. 2, since wireless communication device 160 is used for communication both to handheld computing device 1 (step 804) and to a remote location (step 807 and 550), wireless communication device 160 may include multiple communications systems. That is, for example, wireless communication system 160 may include both an infrared communication device and a radio transmission device. Alternatively, a single transmission method (e.g. radio) is used for both communication with communication link 634 (step 804) and for communicating with a remote location (step 807 and 550).

In the embodiments shown in FIGS. 1–8 criteria for image capture and transmission may be defined by the user or may be set by the particular system. For example, the broadcast of digital video images may be set anywhere from continuous broadcast and real-time transmittal to time delayed incremental video capture and incremental broadcast. In particular, in one embodiment, incremental video capture of two minute video segments, spaced apart by two minute time intervals are broadcast at corresponding two minute intervals. In another embodiment, the video images are compressed so as to limit transmittal time and are captured in five minute intervals. In an embodiment that uses a digital camera, pictures may be taken at set time intervals and stored for incremental broadcast. In one embodiment, pictures are taken every thirty seconds and are broadcast at two minute intervals.

The present invention is adapted to either transmit an image or capture the image and store it locally. In one embodiment, a selection mechanism is provided such that a user can determine the parameters of capturing, forwarding and storing the image locally. The user can select timing of image capture and the rate of image capture. With respect to forwarding the images, the user can determine whether or not the image is to be forwarded, and where the image is to be forwarded to, and can select from available image transfer formats. Also, the user can select that the images be stored locally, either instead of image forwarding or in conjunction with image forwarding.

In one embodiment, the present invention includes a remote control that includes a panic button. Pressing the panic button constitutes an alarm triggering event. This feature may be used during an emergency such as a car-jacking. For example, images of the interior of the vehicle and the position of the vehicle would assist local law enforcement agencies in preventing the car-jacking and may assist them in identifying the car-jackers. In one embodiment, the operation of the airbag is an alarm triggering event. This can be particularly valuable in situations where the passengers are injured since the medical team may assess the medical needs of the passengers prior to arrival on the scene using the transmitted images and the medical team may easily find the location of the vehicle. Furthermore, in situations where procedures are being performed that would endanger the passengers such as use of the jaws-of-life to open up the vehicle, the medical team may use the images of the interior of the vehicle to assure that they are not going to injure a passenger during the procedure.

The present invention is well suited for remote control of the alarm system. In a system having remote control, the user may remotely access the handheld computing device from his home, from a remote control radio, or through a data network. The user can change the capture and broadcast parameters as desired. In addition, the system may allow for on-demand capture and on-demand broadcast such that the user may remotely direct the system to capture images as desired and direct the transmission of the images as desired.

The vehicle alarm system of the present invention overcomes many of the problems associated with prior art alarm systems since there is a permanent record of the theft that is transmitted to a remote location. The position of the vehicle is determined and transmitted along with the images of the passenger compartment of the vehicle. Thus, when a thief is stealing the vehicle, a picture of the thief and the location of the vehicle is transmitted. Thus, the vehicle's owner and/or local law enforcement agencies can easily find the vehicle and easily identify the thief. Even in those situations where a professional thief steals the car and disables the alarm system within a few minutes, there is time enough to broadcast images of the thief and the location of the vehicle.

The alarm system of the present invention is well adapted for uses other than monitoring vehicle theft. That is, the vehicle alarm system of the present invention can be used for monitoring various types of locations. For example, an alarm system such as alarm system 100 of FIG. 2, that is disposed within a handheld computing device could be used to monitor any type of location (e.g. a hotel room, a house, etc.). In such an embodiment, handheld computing device 1a of FIG. 2 would operate independently so as to detect unauthorized entry (e.g. using motion detector 114) and image capture device 150 would capture images of the intruder which would then be transmitted via wireless communication device 160 along with the determined location. The transmission can be coupled directly, or over the internet to a desired destination (e.g. an alarm monitoring company, the police, or a designated e-mail address).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for indicating an alarm comprising:
   a) providing an alarm system adapted to be disposed in a vehicle;
   b) providing a docking stand coupled to said alarm system, said docking stand including a wireless communication link;
   c) providing a handheld computing device adapted to be coupled to said docking stand, said handheld computing device including a wireless communication device, an image capture device and a location determination system;
   d) detecting an alarm triggering event;
   e) recording a digital image using said image capture device upon the detection of an alarm triggering event when said handheld computing device is disposed in said docking stand;
   f) determining location using said location determination system upon said detection of an alarm triggering event when said handheld computing device is disposed in said docking stand;
   g) transmitting said digital image and said determined location to a remote location using said wireless communication device upon said detection of an alarm triggering event when said handheld computing device is disposed in said docking stand; and
   h) transmitting, from said wireless communication link to said handheld computing device, a message indicating the occurrence of an alarm triggering event upon said detection of an alarm triggering event when said handheld computing device is not disposed in said docking stand.

2. The method for indicating an alarm of claim 1 further comprising:
   i) indicating, using said handheld computing device, that an alarm triggering event has occurred when said message transmitted in step h) is received at said handheld computing device; and
   j) when said message transmitted in step h) is received at said handheld computing device, and when a user indicates that a theft has occurred, transmitting a message from said handheld computing device to a remote location.

3. The method for indicating an alarm of claim 2 wherein said message transmitted from said handheld computing device in step j) includes the last known position of said vehicle.

* * * * *